3 Sheets—Sheet 1
W. J. HODGETTS.
Ornamenting Articles of Glass.
No. 210,326. Patented Nov. 26, 1878.
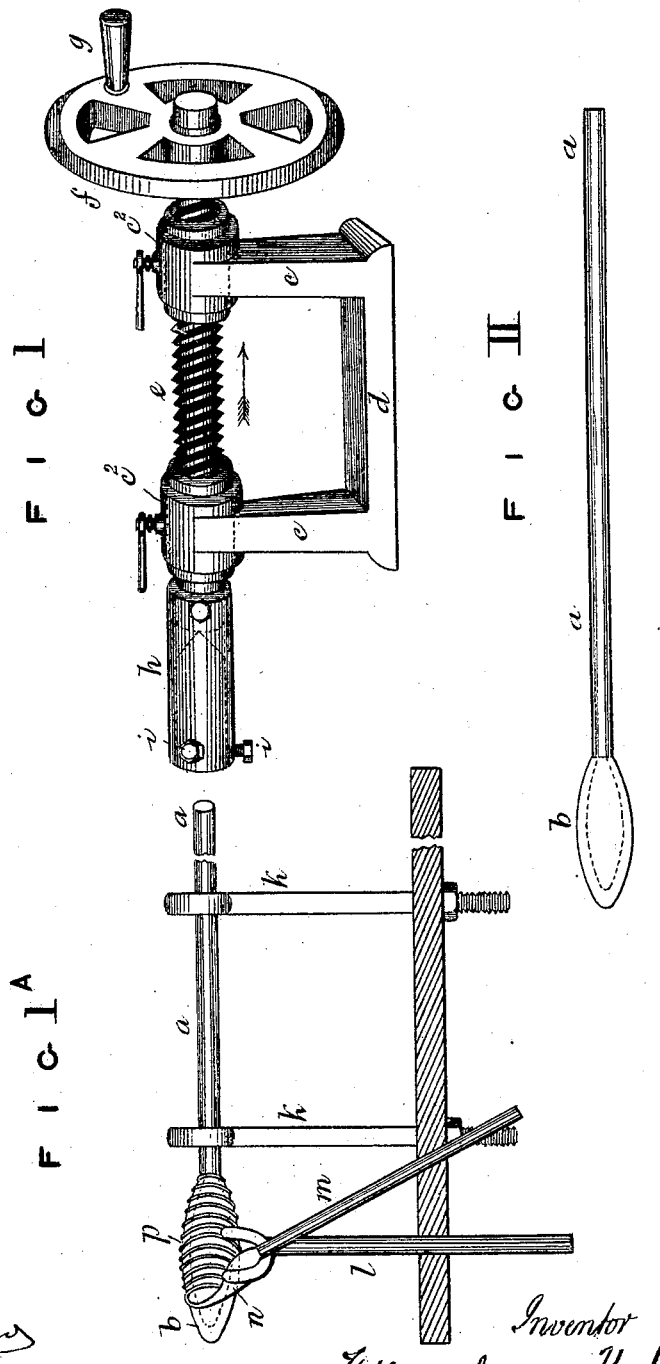

3 Sheets—Sheet 2.
W. J. HODGETTS.
Ornamenting Articles of Glass.
No. 210,326.    Patented Nov. 26, 1878.
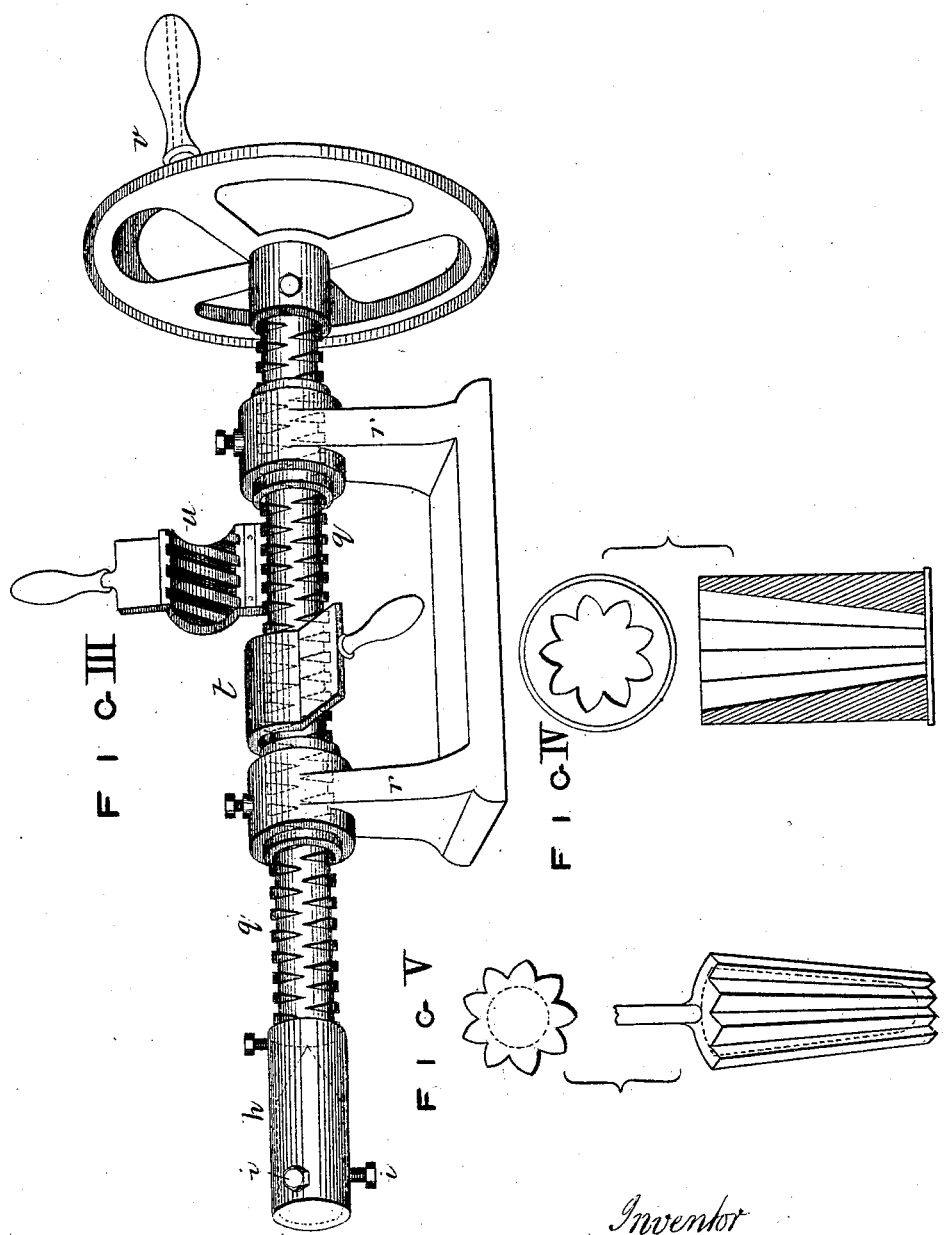
Witnesses,
George Shaw
Richard Skerrett
Inventor
William James Hodgetts.

3 Sheets—Sheet 3.
W. J. HODGETTS.
Ornamenting Articles of Glass.
No. 210,326. Patented Nov. 26, 1878.
FIG. VI
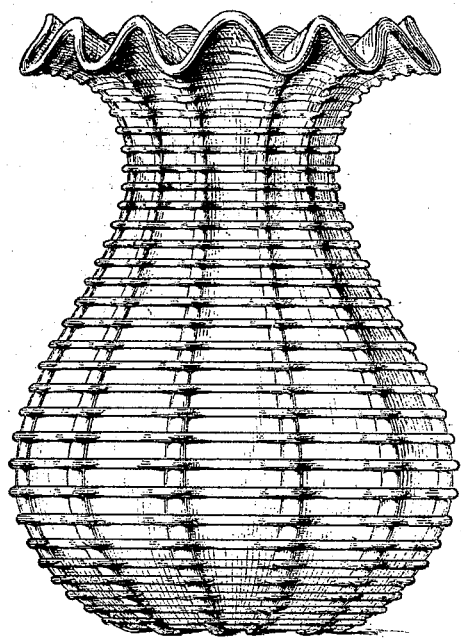

UNITED STATES PATENT OFFICE.

WILLIAM J. HODGETTS, OF WORDSLEY, KINGSWINFORD, ENGLAND.

IMPROVEMENT IN ORNAMENTING ARTICLES OF GLASS.

Specification forming part of Letters Patent No. 210,326, dated November 26, 1878; application filed November 4, 1878; patented in England, May 6, 1876.

*To all whom it may concern:*

Be it known that I, WILLIAM JAMES HODGETTS, of the firm of Hodgetts, Richardson & Son, of Wordsley, Kingswinford, in the county of Stafford, England, glass-manufacturers, have invented new and useful Improvements in Ornamenting Articles of Glass, and in machinery or apparatus employed for that purpose, which improvements are fully set forth in the following specification, reference being had to the accompanying drawings.

My invention consists in ornamenting articles of glass by the method hereinafter described, by which an appearance is given to the surface of the article somewhat similar to that of fine wicker or basket work; and, further, of the machinery or apparatus hereinafter described, by the use of which machinery the method of ornamenting referred to is readily carried into effect.

I will describe the method of ornamenting, in conjunction with the machinery or apparatus I employ.

The glass to be made into an article ornamented according to my invention is gathered from the pot upon the iron or tubular rod employed when blown articles are to be made. By the ordinary method of treatment the gathered glass is fashioned into a hollow, nearly cylindrical, figure, or a hollow bulb or long egg-shaped figure. The iron carrying the glass is fixed in a horizontal position to the end of a horizontal screw, capable of being rapidly turned, and passing through a screw-box, so that it may have an advancing, as well as a rotatory, motion communicated to it by turning it. A portion of highly-heated glass is gathered upon a "punty" or "pontie," and the pointed end of the said heated glass is brought in contact with and made to adhere to the end of the glass on the iron. The punty carrying the highly-heated glass is supported by a fixed support, capable of adjustment to any required position. By means of a winch a rapid rotatory motion is given to the screw and the iron, and the glass on the end of the said iron draws off and coils upon itself a fine thread of glass from the glass on the punty. The advancing motion of the screw and iron causes the thread of glass to be coiled upon the glass on the iron in coils at uniform distances apart. The hollow glass thus wound round with an attached thread of glass is reheated and blown in ribbed or other molds, whereby a series of longitudinal and other ribs are formed on it, the wound thread being not at all, or but little, interfered with by the action of the ribbed mold. The ribbed mold not only gives a ribbed figure to the glass blown in it, but makes the substance or thickness of the glass less at the parts between the ribs than in the ribs themselves. The glass thus operated upon may now be fashioned into a jug, vase, or other vessel or article in the ordinary way.

In the finishing of the article the blowing process distends the portions of the glass between the ribs more than the thicker portions constituting the ribs themselves. The effect of this is to leave the ribs themselves well marked or prominent, and the portions of the threads passing over the ribs very distinct, while the threads between the ribs are less prominent.

Figure 1 of the accompanying drawings represents in perspective, and Fig. 1<sup>A</sup> in side elevation, the machine by which I carry my invention into effect.

$a$ is the iron or hollow rod upon which the hollow bulb of glass $b$ to be ornamented is formed or blown in the ordinary way. The iron and the hollow bulb of glass are represented in Fig. 2. $c\ c$ are uprights on the bed-plate $d$, which uprights $c\ c$ carry at their summits screw-boxes $c^2\ c^2$. In the screw-boxes $c^2\ c^2$ the horizontal screw $e$ works. The rear end of the screw carries a hand-wheel, $f$, by turning the handle $g$ of which a rotatory motion may be given to the said screw $e$. The front end of the screw $e$ carries a socket or holder, $h$, into which the end of the iron $a$ is inserted and fixed by the set-screws $i\ i$. $k\ k$ are uprights with forked tops, in which forked tops the iron $a$ is supported. $l$ is another forked upright, in which the punty $m$ is supported. After the hollow glass bulb $b$ has been formed upon the iron $a$, Fig. 2, the said iron is placed in the forked adjustable uprights $k\ k$, its rear end being inserted and fixed in the holder $h$. A portion of heated glass, $n$, having been collected on the punty $m$, the said punty is supported in the forked upright $l$. The end of the heated glass $n$ is brought in contact with one end of the hollow glass bulb $b$ and adheres thereto. The hand-wheel $f$ is now turned by its handle $g$, when, a rotatory motion being given to the screw $e$, the said screw both rotates and advances in one or the other direction in the screw-boxes $c^2$ $c^2$. Like motions are thereby given to the iron $a$ and glass bulb $b$, and glass from the mass $n$ on the punty $m$ is coiled in equidistant threads on the bulb $b$, as will be understood by reference to Fig. 1, where the equidistant threads on the bulb $b$ are marked $p$. The direction in which the handle $g$ is turned depends upon which end of the bulb $b$ the coiling of the thread of glass is commenced. I prefer to commence the coiling at that end of the glass bulb $b$ attached to the iron $a$, in which case the screw $e$ must be turned in the direction proper to cause it to advance in the direction of the arrow, Fig. 1.

Fig. 3 represents, in perspective, a modification of that part of the machinery represented in Fig. 1. In the said modification, Fig. 3, the screw $q$ is provided with two threads—that is, a right-handed screw-thread, and a left-handed screw-thread—which cross each other, as will be understood by an examination of the drawing. The summits of the uprights $r$ $r$ do not contain screw-boxes, the screw $q$ sliding freely therein. In order to give the required longitudinal or advancing motion to the screw $q$ when it is made to rotate, I employ two half screw-boxes, $t$ $u$, which are hinged to a fixed part of the framing of the machine. One of the said half screw-boxes $t u$ has a right-handed screw-thread, and the other a left-handed screw-thread, and either of them may be made to engage with one of the threads on the screw $q$, and give the advancing motion to the said screw by being turned down upon the said screw, as shown at $t$, the other half screw-box, $u$, being lifted from off the said screw $q$. By the use of this modification two crossing threads of glass may be coiled upon the hollow bulb of glass $b$ on the iron $a$, Fig. 1$^A$. In order to effect this, the handle $v$ is turned (one of the half screw-boxes being turned down upon and engaged with the screw $q$) until the bulb $b$ has been threaded throughout its whole length with a single thread of glass. By then lifting the half screw-box which had been depressed upon the screw $q$ and depressing the other half screw-box upon the screw, the motion of the handle $v$ being continued in the same direction, the said screw performs its return motion, and a second thread is coiled upon the bulb $b$, crossing that which had been just coiled thereon. The machine, Fig. 3, may be employed for coiling single threads as well as for coiling double threads.

After the coiling of the glass thread or threads upon the hollow glass bulb $b$ in the manner described, the iron $a$ is detached from the holder $h$, and the threaded hollow bulb $b$ is reheated. It is then blown in a ribbed mold of any desired pattern, whereby a series of ribs crossing the coiled threads are produced on the partially-formed article, which is afterward made into a vase, jug, or other article in the usual way.

Fig. 4 represents, in plan and vertical section, a ribbed mold of the kind referred to; and Fig. 5 represents, in plan and elevation, the partially-formed article after it has been blown in the mold, Fig. 4. The threads upon the partially-formed article Fig. 5 are, however, not represented in the said Fig. 5.

Fig. 6 represents a small vase or flower-glass ornamented according to my invention. By reference to the said Fig. 6 it will be seen that the threads wound upon the bulb $b$, Fig. 1$^A$, are almost obliterated in the finished article, Fig. 6, in the parts between the ribs, while the said threads are well pronounced upon the summits or ridges of the said ribs, and that the appearance given to the surface of the ornamented article is similar to that of fine wicker or basket work. The threads may either be of flint or of colorless glass, or they may be of colored glass.

I do not confine myself to the use of molds having straight angular and equidistant ribs, as represented in Fig. 4, as ribbed molds of other kinds and shapes may be employed— such, for example, as molds having ribs of various patterns, or having alternating ribs of different sizes; molds with ribs inclined or twisted; or molds having ribs combined with other ornamental shapes.

Although my invention is especially applicable to table-glass and other vessels of glass, yet it may be applied to all such articles of glass as are in the early stages of their manufacture made by blowing bulbs or hollow cylinders of glass. For example, certain kinds of glass used for glazing, and which are known in commerce only in the form of flat sheets, are produced by blowing hollow cylinders of crown-glass, which, being divided in a line parallel with the axes of the hollow cylinders and reheated, are flattened out into sheets. Such glass may be readily ornamented according to my invention by coiling upon the hollow cylinder or bulb of crown-glass single or double threads, either of colored or of colorless glass, and afterward blowing the bulb or cylinder in a ribbed mold before manufacturing it into the hollow cylinders from which the sheet glass is produced. The sheets of glass so ornamented present the appearance of a delicate reticulation in plain or colored glass upon ordinary crown-glass.

Although I have described and represented the machinery which I have found to answer well in practice for coiling the glass threads upon the hollow bulb or cylinder of glass, yet I do not limit myself to the use of the said machinery, as the said coiling may be effected by machinery otherwise constructed.

Having now described the nature of my invention, and the manner in which the same is to be performed, I wish it to be understood that I do not limit myself to the precise de- tails herein described and illustrated, as the same may be varied without departing from the nature of my invention; but

I claim as my invention of improvements in ornamenting articles of glass and in machinery or apparatus employed for that purpose—

1. The process or combination of processes hereinbefore described, and illustrated in the accompanying drawings, for ornamenting articles of glass, whereby an appearance is given to the surface of the articles somewhat similar to that of fine wicker or basket work, the said ornamenting being effected by coiling one or more threads of colorless or colored glass upon a hollow glass bulb or cylinder, from which the article is to be subsequently manufactured, and blowing the said threaded hollow bulb or cylinder in a ribbed mold, substantially as described and illustrated.

2. The herein-described apparatus for effecting the coiling of glass threads upon hollow glass bulbs or cylinders, the same consisting of mechanism, substantially as specified, for sustaining and revolving the glass bulb or cylinder in proximity to a quantity of heated glass from which the threads are to be drawn, and for causing at the same time a motion of the bulb and thread-yielding material past each other in the direction of the length of the bulb or cylinder, as set forth.

WILLIAM JAMES HODGETTS. [L. S.]

Witnesses:
   GEORGE SHAW,
   RICHARD SKERRETT,
   *Both of 37 Temple Street, Birmingham.*